Aug. 7, 1962 W. W. KENNEDY Re. 25,216

AIR DISTRIBUTION OUTLET

Original Filed Aug. 16, 1955 8 Sheets-Sheet 1

INVENTOR.
Walter W. Kennedy
BY
Carlson, Pitzner, Hubbard & Wolfe
ATTORNEYS

AIR DISTRIBUTION OUTLET

Original Filed Aug. 16, 1955 8 Sheets-Sheet 2

INVENTOR.
Walter W. Kennedy
BY
Carlson, Pitzner, Hubbard & Wolfe
ATTORNEYS

AIR DISTRIBUTION OUTLET

Original Filed Aug. 16, 1955 8 Sheets-Sheet 3

INVENTOR.
Walter W. Kennedy
BY
Carlson, Pitzner, Hubbard & Wolfe
ATTORNEYS

INVENTOR.
Walter W. Kennedy
BY
Carlson, Pitzner, Hubbard & Wolfe
ATTORNEYS

AIR DISTRIBUTION OUTLET

Original Filed Aug. 16, 1955 8 Sheets-Sheet 5

INVENTOR.
Walter W. Kennedy
BY
Carlson, Pitzner, Hubbard & Wolfe
ATTORNEYS

AIR DISTRIBUTION OUTLET

Original Filed Aug. 16, 1955 8 Sheets-Sheet 6

INVENTOR.
Walter W. Kennedy
BY
Carlson, Pitzner, Hubbard & Wolfe
ATTORNEYS

AIR DISTRIBUTION OUTLET

Original Filed Aug. 16, 1955 8 Sheets-Sheet 7

INVENTOR.
Walter W. Kennedy
BY
Carlson, Pitzner, Hubbard & Wolfe
ATTORNEYS

AIR DISTRIBUTION OUTLET

Original Filed Aug. 16, 1955 8 Sheets-Sheet 8

INVENTOR.
Walter W. Kennedy
BY
Carlson, Pitzner, Hubbard & Wolfe
ATTORNEYS

United States Patent Office

Re. 25,216

Reissued Aug. 7, 1962

25,216

AIR DISTRIBUTION OUTLET

Walter W. Kennedy, Rockford, Ill., assignor to Barber-Colman Company, Rockford, Ill., a corporation of Illinois Original No. 2,821,898, dated Feb. 4, 1958, Ser. No. 528,670, Aug. 16, 1955. Application for reissue Jan. 14, 1960, Ser. No. 2,557

17 Claims. (Cl. 98—40)

Matter enclosed in heavy brackets [ ] appears in the original patent but forms no part of this reissue specification; matter printed in italics indicates the additions made by reissue.

This invention relates to outlets for use in air conditioning systems to control the manner of distribution of air into a room.

A general object is to provide an outlet which may be adjusted easily to vary the direction, pattern, or volume of the discharged air, which produces a high aspirating effect, and which has a generally flat discharge face that may be disposed substantially flush with the room wall and thus blended into an acoustical tile or other block type construction.

A more detailed object is to employ a perforated plate for the face of the outlet combined in a novel manner with a deflector acting on the incoming air stream to control the discharge through the plate perforations and produced desired angles of discharge of the air into the room.

A third object is to correlate in a novel manner the dimension of the inlet or neck of the unit with the thickness and free air area of the perforated face plate to enable a centrally located deflector to be effective in exercising the desired control over the direction of the air discharge into the room.

A fourth object is to provide an outlet of the above character in which different angles and patterns of discharge of the air are achieved by a novel construction and positioning of the deflector.

A fifth object is to provide a novel construction of the deflector which effectually avoids discoloration of the exposed face of the perforated plate by contact with room aspirated air even though the air delivered through the unit is at a very low temperature.

A sixth object is to correlate the shape of the deflector with that of the inlet and outlet of the unit so as to vary the velocities attained in the discharged air stream at different points angularly spaced and outwardly beyond the periphery of the outlet opening.

A seventh object is to provide within the unit a novel arrangement of vanes for controlling the volume of air delivered through the unit.

An eighth object is to provide a novel means for varying the pattern of the air discharge automatically in accordance with changes in the condition of the incoming air.

A ninth object is to adapt the unit for the return of air from the room through the unit itself.

Other objects and advantages of the invention will become apparent from the following detailed description taken in connection with the accompanying drawings, in which FIGURE 1 is a fragmentary cross sectional view of the wall of a room equipped with an air distribution unit embodying the novel features of the present invention, the unit being shown as a section taken along the line 1—1 of FIG. 2.

Figure 23:
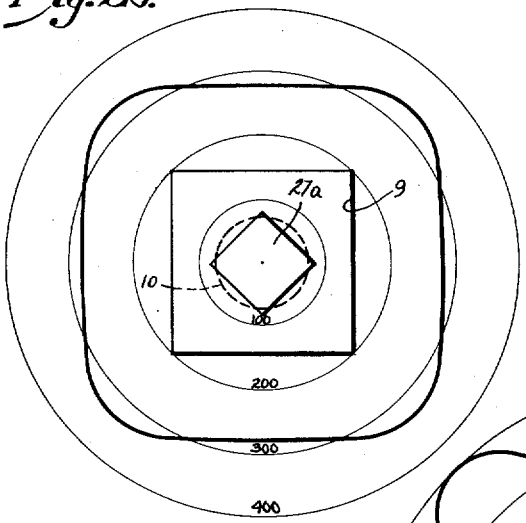
Figure 24:
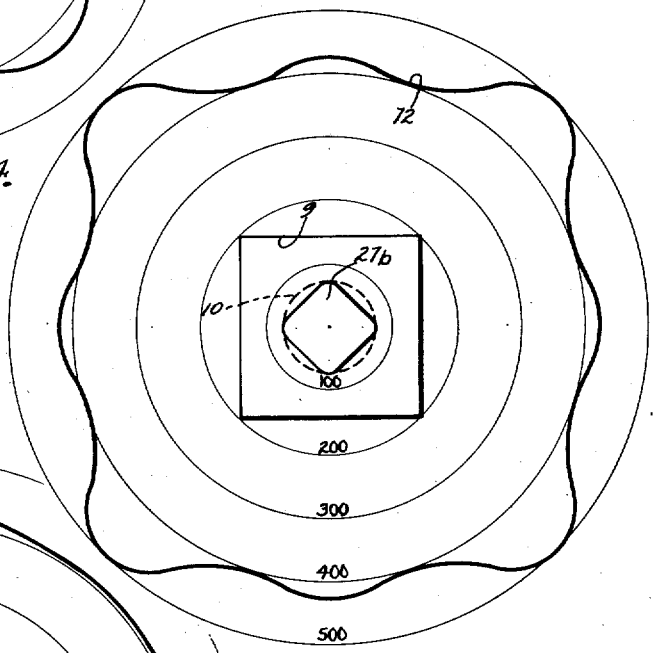
Figure 25:
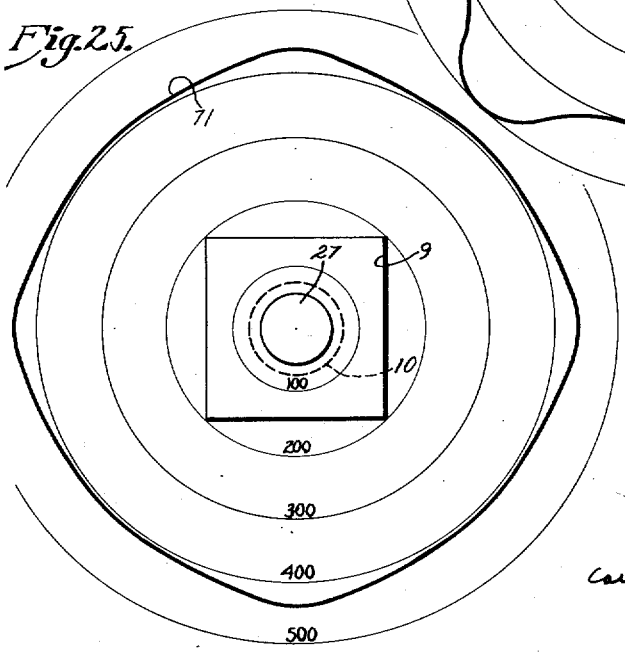

FIGS. 23, 24, and 25 are similar charts for different rangements and shapes of the deflector inlet.

While the invention is susceptible of various mod cations and alternative constructions, I have shown the drawings and will herein describe in detail the p ferred embodiment. It is to be understood, howev that I do not intend to limit the invention by such disc sure, but aim to cover all modifications and alternat constructions falling within the spirit and scope of invention as expressed in the appended claims.

The improved distribution unit includes a tubular ( ing having a collar 10 at one end defining an inlet 11 flaring at the opposite or outlet end which is adapted be mounted in the ceiling 12 and, as shown in FIGS. and 11, may be of the same size and shape as the or blocks 13 commonly used in acoustical walls. collar 10 is adapted to telescope within and be connec to the branch 14 of an air supply duct 14a.

Figure 1:
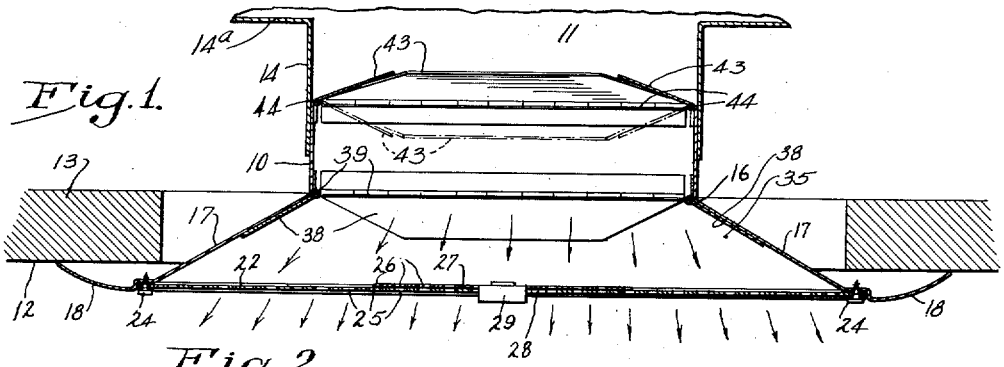

In the forms shown in FIGS. 1, 2 10, and 15, the co 10 is square in cross section and the ends of its flat s merge at 16 with the casing walls 17 which are flat the way to the discharge edge and form a pyram frustum having a slope of about 60°. The walls 17 minate in flanges 18 which may, if desired, overlap adjacent parts of the ceiling as shown in FIGS. 1 an and define edges of a rectangular outlet opening 9. an alternative, the edge portion of the flange may bent upwardly at right angles as indicated at 19 in FI 10 and 15 and sized to fit between four of the ceilin wall blocks 13. In this case, the flange edges 18a formed with longitudinal ribs 20 which form gro receiving the ribs on the usual T-bars 21 that are to support the adjacent ceiling blocks.

The inner peripheral portion of the flanges 18 or is depressed slightly to provide a seat for receiving edges of a flat perforated face plate 22 which is subs lly flush with the outer face of the flange 18 and may enclosed at its edges by a narrow frame 23 secured the flange by screws 24. The perforations 25 in the ıte 22 are relatively small and of equal size and, to ɔvide the necessary impingement areas for causing eral spreading of the discharged air streams as will be ɔcribed later, the perforations are spaced apart uni- mly and correlated in size with the plate thickness so to permit the free flow of air outwardly and at large ;les relative to the axis 15 as indicated by the arrows in ɜ. 4. The shape of the holes is largely a matter of ign preference. For example, they may be circular shown in FIGS. 2, 5, and 10 or of any other desired pe such as the elongated slots 25ª shown in FIGS. 6 . 7 arranged in groups with the slots of adjacent groups ɔendicular to each other.

Figure 8:
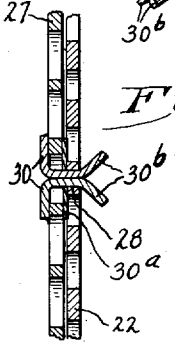
FIG. 8 is a fragmentary sectional view taken along th line 8—8 of FIG. 5.

'he invention aims to controllably vary the pattern of air discharged through the perforations of the outlet correlating numerous factors including the thickness he face plate 22, the free area of the plate, and the of the uncovered plate area in relation to the effec- area of the inlet 11. Preferably, the face plate is than .035 of an inch thick and the free air area there- ugh, that is, the total area of the holes 25, is between ınd 55 percent of the total area of the plate. The of the plate should be at least four times the free of the inlet 11 at its smallest section.

ith a unit thus proportioned, the desired control over air discharge pattern is achieved through the use of flector member 27 smaller in size than the inlet 11 disposed within the flared portion of the casing nd the end of the inlet to intercept part of the air m delivered through the latter, the deflector being ɔrated by holes 26 (FIG. 5) and 26ª (FIG. 6) and ıtably mounted if it is desired to vary the amount ıch interception after installation in service use. ɜrably the deflector member takes the form of a thin lying adjacent the face plate 22 and movable relative to to bring the holes 26 or 26ª therein into varying ɜs of register with the perforations 25 of the face . In the forms shown in FIGS. 5 and 6, the holes ıf the same size and shape as the perforations 25 5ª in the face plate and are equally spaced over the : area of the disk.

ıile the disk may be rotatably mounted on the face and turned relative thereto to obtain different areas terception of the incoming air stream as shown in . 13 and 15, it is preferred to adjust the disk edge- n a straight line. To this end, the face plate 22 is ɜd with an elongated slot 28 (FIGS. 5, 6, and 8) y receiving a bar 29 herein comprising two strips g bent over flanges 30 which are welded or other- ɜecured against the top of the deflector disk with a · 30ª separating the two so as to permit free edge- hifting of the disk.

Figure 2:
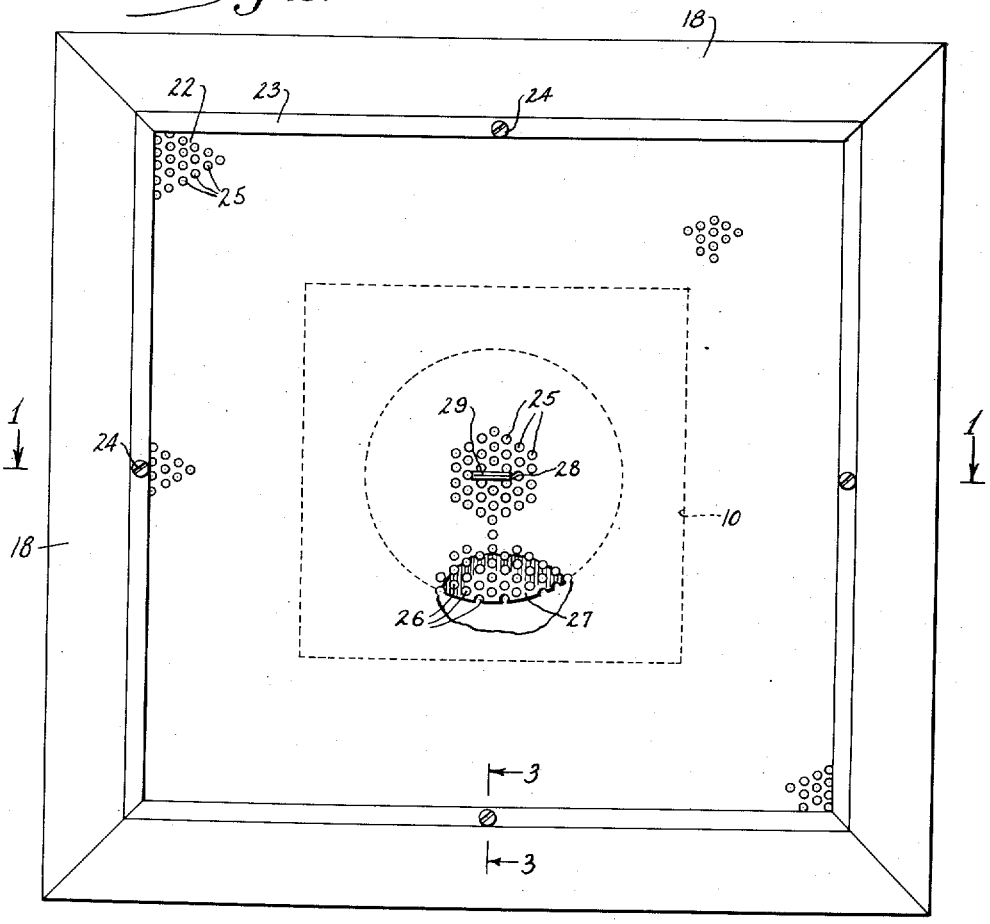
FIG. 2 is a face view of the unit.
Figure 3:
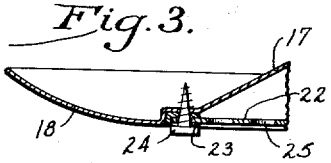
FIG. 3 is an enlarged fragmentary section of a part of FIG. 1.
Figure 5:
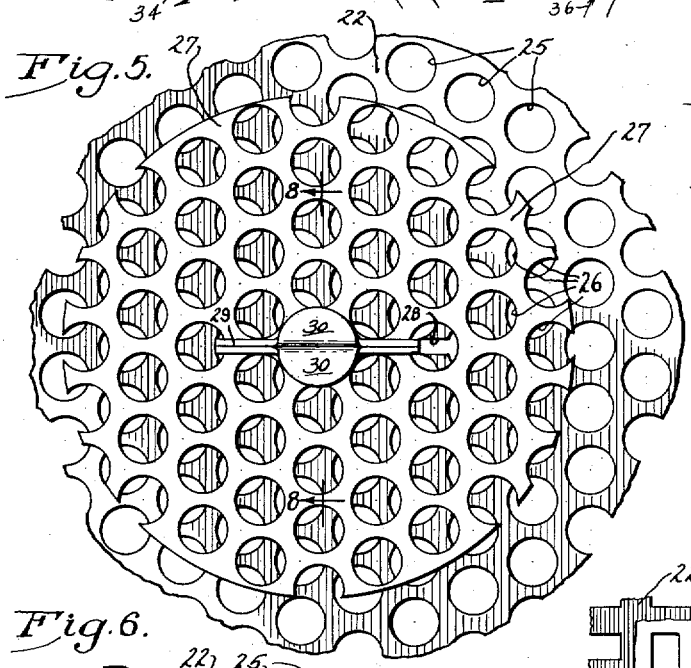
FIG. 5 is an enlarged fragmentary view of a portion o the face plate of the unit.
Figure 9:
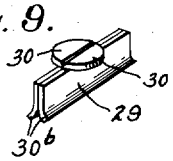
FIG. 9 is a perspective view of one part of the deflectc member.
Figure 7:
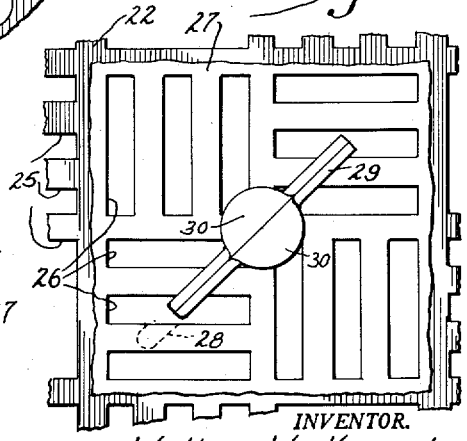
FIGS. 6 and 7 are views similar to FIG. 5 showin modified shapes of the face plate perforations and illus trating different positions of the parts.
Figure 6:
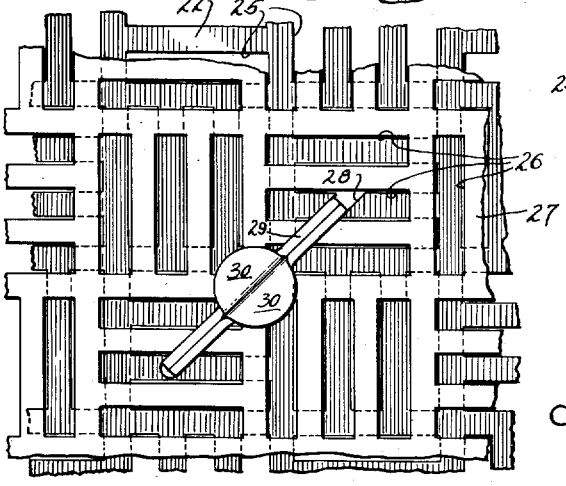
Figure 10:
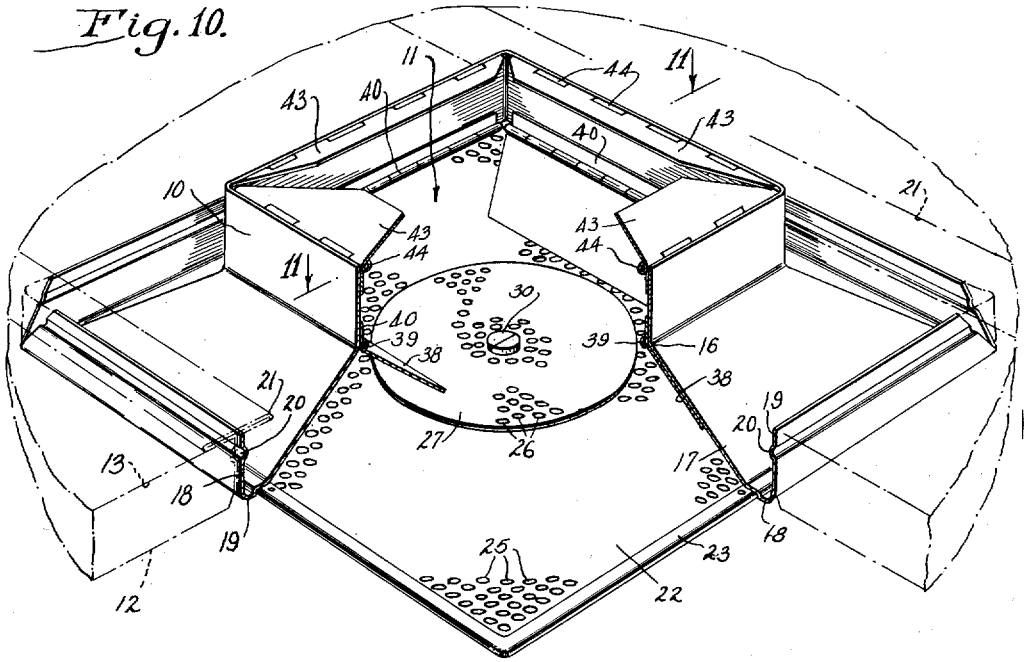
FIG. 10 is a fragmentary perspective view of the in proved unit looking at the top thereof.

: other edges of the strips project through the slot d are spread apart as indicated at 30ᵇ to provide a : which may be grasped to shift the bar and disk the slot. The bar is thus secured to the disk but le with a close friction fit along the slot 28 which g enough to permit the holes and perforations on sk and face plate to be brought into full register 1), any desired degree of partial register (FIG. 5), be fully covered (FIG. 6). When circular holes ɜrforations are employed as illustrated in FIGS. 1, 10, the slot 28 is extended diametrically of one : holes in the respective plates. In the case of the pattern shown in FIG. 5, the slot 28 extends di- ly of the elongated perforations 25 and 26 which ɔstantially covered in the position shown in FIG. 6. : bar 29 is slid upwardly and to the right, full : of the perforations and holes is attained when reaches the end of the slot as shown in FIG. 7.

certain patterns of distribution of the discharged : deflector 27 may be circular in shape and is rounded and, for the square faced outlet shown, is re- lated in size to that of the inlet 11. When circular in shape as shown in FIGS. 2, 5, and 10, the diameter of the disk is more than half the minimum transverse di- mension of the inlet but substantially less than the trans- verse dimension. With the diameter of the circular disk equal to two-thirds of the length of one side of the square inlet as shown in FIG. 1, the effective cross section of the inlet is 2.8 times the area of the disk.

With the face plate 22 perforated to provide a large free area as described and the deflector 27 disposed opposite and of substantially smaller area than the inlet 11, it will be apparent that the total area of the plate holes 25 or 25ª surrounding the deflector is substantially greater than the cross-sectional area of the inlet 11. As a result, the entire volume of air delivered through the inlet will flow through the unit without a change in its direction before contacting the face plate and without loss of its velocity or the creation of a static pressure within the unit. Thus, the deflector 27 may be used in accordance with the present invention to govern the direction of the air discharge from the face of the per- forated plate 22 so as to produce various desired patterns for effective distribution of the air within the room in which the unit is eventually installed.

The unique manner in which the casing, the perforated face plate, and the adjustable deflector coact to produce various air discharge patterns will now be described, it being first assumed that the deflector is shifted to the position shown in FIG. 4 to bring the perforations 25 and the holes 26 out of register and thus close the central part of the face plate against the flow of air therethrough. In this position, the impingement area presented to the air stream delivered through the inlet 11 will be a maxi- mum.

As the central portion of the advancing air stream en- counters the closed disk, it will be deflected laterally and outwardly and, since an air stream does not bounce back- wardly, the flow will be radially and outwardly in all di- rections along the inner surface of the disk as indicated by the arrows 32. Such outward lateral flow into the outer annular portion of the air stream as indicated at 33 will bend the latter outwardly as it passes through the perforations 25 as indicated at 34. The outward bending is further increased as a result of the low pressure region which develops at 35 within the casing due to the outward flaring of the walls 17 and the fact that the latter are of straight contour all the way to the edge of the outlet. As a result of these two actions (the low pressure at 35 and the outward spreading of the central part of the air stream by the deflector 27), the four blankets of air flowing downwardly along the flat walls 17 will be bent upwardly as they enter the room and will fan outwardly at a rela- tively small angle to the ceiling. Such wide spreading of the air stream is particularly desirable in cooling systems.

Figure 4:
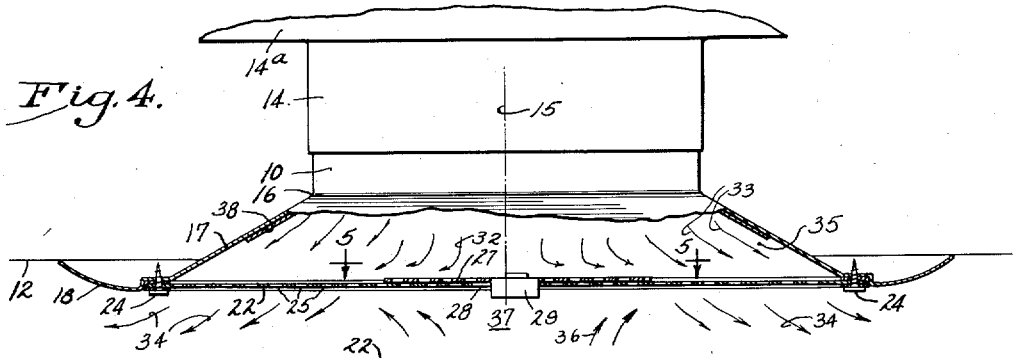
FIG. 4 is a view similar to FIG. 1 showing a different position of adjustment.

*From the foregoing, it will be apparent that when the deflector 27 is positioned as shown in FIG. 4 so as to close the opposing holes 25 in the face plate, an imper- forate mask is formed over the area of the face plate covered by the deflector. This mask thus acts to intercept a corresponding portion of the air stream delivered through the inlet and deflect such air outwardly and laterally across the surrounding perforated area of the face plate thus causing the air discharged through the holes of such area to be diverted outwardly.*

*The above described action of the deflector 27 in pro- ducing the outwardly diverging pattern of the discharged air as shown in FIG. 4 is attributable to the flow of air through the casing without loss of its velocity pressure or conversion thereof to static pressure within the casing. Such a flow path results, as above described, by making the area of the discharge outlet, that is, the combined area of the exposed perforations 25 surrounding the deflector larger than the cross-sectional area of the inlet 11. In this way, the building up of a back pressure within the*

*casing and the consequent discharge of the individual air streams downwardly and perpendicular to the face of the plate is prevented.*

The unit conditioned as above described is particularly effective in producing a strong aspirating action below the unit as the air stream advances into the room, that is, to cause mixing of incoming cool air with the room air so as to avoid exposure of the occupants to objectionable downwardly directed cold drafts. Since the central part of the face plate is now closed, and the air is discharged in a tubular outwardly flaring stream, there will be a relatively large region of low pressure immediately below the center of the unit. Room air drawn into this region as indicated by the arrows 36 will be exposed to the interior of the incoming stream and will mix rapidly with the latter. Also, due to the perforated character of the face plate, the incoming air will be divided into a multiplicity of small streams at the points of entry into the room. By aspiration, air from the room will be drawn laterally and in between these streams and mixed quickly with the latter owing to the large peripheral areas thereof.

The unit above described may, simply by adjustment of the deflector 27, be adapted for use in a heating system where it is usually desirable to direct most of the air downwardly in a substantially vertical direction. For this purpose, the disk 27 may be shifted to the position shown in FIG. 1 in which the holes 26 are in full register with the perforations 25 in the face plate. As indicated by the arrows, air will flow vertically down through all of the holes in the disk and very little of the above described deflecting action of the latter will be exerted. At the same time, the low pressure in the region 35 will not, while acting alone, produce appreciable outward bending of the peripheral part of the air stream; consequently there will be little spreading of the stream as it is discharged into the room.

The conditions above described and illustrated in FIGS. 1 and 4 represent the extreme limits of the range through which the pattern of the discharged air may be varied to suit the requirements in various air conditioning installations. Any desired variation of the pattern within this range may be achieved by adjusting the deflector to the proper intermediate position. In such a case, the proportion of the incoming air which is delivered vertically will correspond to the amount of the uncovering of the central perforations 25. Similarly, the deflecting action of the disk 27 and therefore the degree of spreading of the discharged air will decrease progressively as the perforations are uncovered. As a result, the spread and the throw of the discharged air stream may be varied to suit the prevailing service conditions including temperature of the delivered air, ceiling height, room size, etc.

Figure 11:
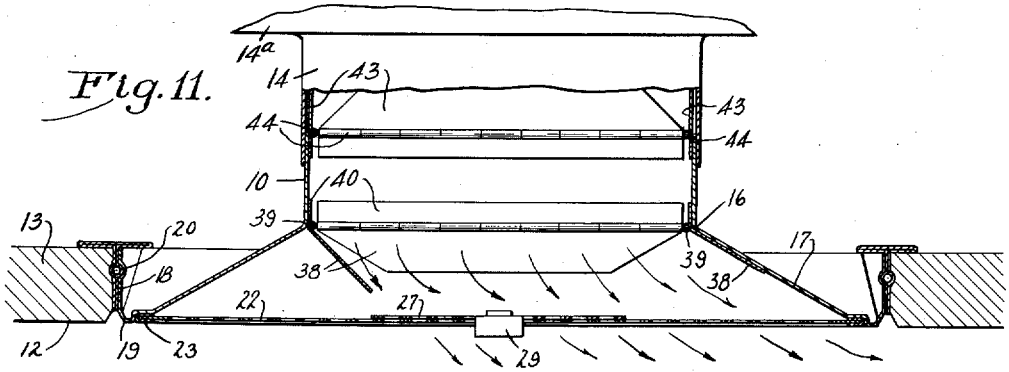
FIG. 11 is a section taken along the line 11—11 ( FIG. 10.

The invention also contemplates the provision of novel means arranged within the casing for selective adjustment to vary the direction of the discharged air stream and also the volume of air delivered through the outlet. In the form shown, this means comprises four generally flat vanes or baffles 38 of trapezoidal shape disposed within the inlet 11 with their longer edges substantially coextensive with the sides of the collar 10 and joined to the latter through hinges 39 (FIGS. 10 and 11). The latter may be of the so-called pintle type with one set of eyes formed at the edge of vanes 38 and the other set bent from a strip 40 spot welded or otherwise secured against the collar 10 so as to locate the hinge axes near and along the lines 16 of the intersection of the collar and the respective walls 17 so that the baffles may be swung downwardly and outwardly to inactive positions against the inner sides of the walls 17 as shown at the right in FIG. 10. By closely fitting the hinge parts, enough friction may be developed to maintain any adjusted position of the individual baffles. The latter are shorter than the vertical space between the hinges 39 and the face plate 22, but long enough to overlie the extreme outer edge of the deflector 27 when inclined at about forty-five degrees as shown in FIG. 11.

In this position of the baffle 38, the corresponding pe forated side portion of the face plate, although not closel covered by the baffle, is nevertheless blocked effectuall against any substantial flow of air therethrough. Thus if it is desired to confine the outward flow of the air t two directions from opposite sides of the outlet, the baf fles 38 corresponding to these directions are left in th inactive positions against the wall 17 as in the case o the upper and lower baffles in FIG. 10 while the othe two baffles are swung into active position as shown i FIG. 10. The latter baffles effectually block off the out ward flow of the air from their corresponding sides o the outlet and a two way discharge of the air is attaine from the other two sides of the outlet. If the air dis charge is to be in only one direction, the other three o the baffles are swung to active position. Or, if a thre direction discharge is desired, only the baffle correspond ing to the other direction is raised to active position the other three being left inactive and against the walls 17

The baffles 38 are most effective in their blocking o masking action when disposed at about 45° to the fac plate as in the case of the right and left hand baffles show in FIG. 10. If only a partial blocking action in one o more directions is desired, the corresponding baffles ma be swung only part of the distance between the inactiv and fully effective positions for example as shown i FIG. 11. Thus a lesser outward spreading of the discharged air stream may be achieved in the directions thus selected.

Figure 12:
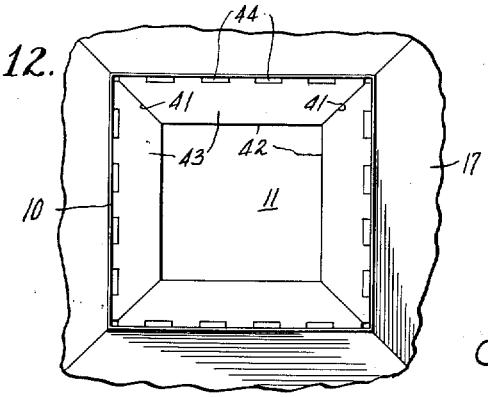
FIG. 12 is a fragmentary plan view of FIG. 10.

The baffles 38, when mounted as described above, may be utilized to perform the additional function o regulating the volume of air delivered through the outlet without detracting from the impinging action of the deflector 27 in producing outward spreading of the air stream. For this purpose, all of the baffles or vanes are swung inwardly and upwardly beyond the vertical and toward the horizontal positions shown in FIG. 12, in which the greatest volume reduction is produced. In this position, the inclined ends 41 of the vanes lie close to each other at miter corners and the inner or free edges 42 cooperates with each other to define the inlet 11 which, although of reduced area, remains centered with respect to the collar 10, the face plate 22, and the deflector disk 27. The latter thus operates as described above in controlling the pattern and the throw of the discharged air stream.

The effective area of the inlet 11 may be increased from this minimum cross section by further opening of the baffles 38 in unison. This is done by swinging the vanes downwardly from the horizontal positions until the desired rate of flow through the inlet is attained.

For installations where it is desired to vary both the pattern and the volume of the discharged air, a second set of vanes 43 (FIGS. 10 and 11) similar to the baffles 38 may be mounted on the collar 10 and spaced above the baffles 38. As in the case of the baffles 38, the vanes 43 are of trapezoidal shape and project from hinges 44 that may be secured to the sides of the collar 10 along the upper edge of the latter. These vanes may lie in inactive vertical position against the sides of the collar 10 or be swung into the inlet as shown in FIGS. 1 and 10. The effective area of the inlet may thus be reduced according to the volume of air desired to be delivered through the outlet. By positioning the various vanes 43 at the same angles relative to the horizontal, the inlet opening defined by their inner free edges will always be centered properly relative to the axis of the unit and the deflector 27 and the discharged air will be distributed uniformly around the outlet.

The damper vanes 43, when used to reduce the volume of air delivered through the unit, do not detract from the versatility of the unit in providing for long or short throws of the air stream. When a short throw is desired, the vanes 43 would be swung upwardly and away from the face plate in order to obtain the desired uction in the volume of air delivered. In this posi-
ı, the air stream flowing through the inlet of reduced
a expands considerably within the flared portion of
casing and thus strikes the deflector 27 at a lower
ɔcity. The outward throw of the air into the room
educed correspondingly.

When a long throw at reduced volume is desired, the
es 43 are swung inwardly to reduce the area of the
t but are inclined downwardly as shown in phantom
FIG. 1. The free ends of the vanes then cooperate
form an orifice disposed close to the deflector 27
inst which the air impinges at relatively high velocity.
s, as described above, increases the outward flow of
discharged air stream.

Figure 16:
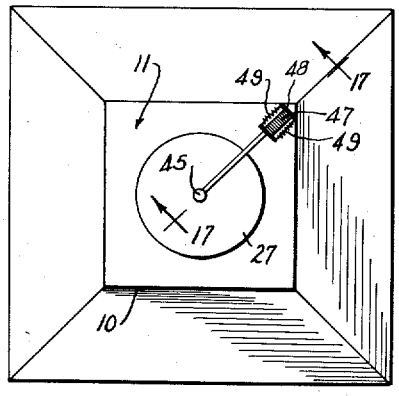
FIG. 16 is a plan view of a modification of the u shown in FIG. 1.
Figure 17:
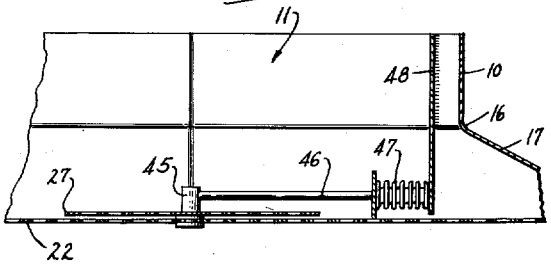
FIG. 17 is a fragmentary sectional view taken alo the line 17—17 of FIG. 16.

The distribution unit above described lends itself readily
adjustment automatically with changes in operating
ditions, for example, the delivered air temperature
en the conditioning system is changed from heating
cooling operation and vice versa. For this purpose,
deflector member 27 is slidably mounted on the face
te as described above and connected, preferably
ɔugh an upstanding lug 45 (FIGS. 16 and 17) near its
ter to one end of a rod 46 whose other end is coupled
the movable end of a bellows 47. The other end of
latter may be secured to a bracket 48 rigid with the
ing of the outlet. Contractile springs 49 stretched
ween the bracket and the movable end of the bellows
tend to contract the latter as permitted by the pre-
ling volume of the expansible fluid filling the bellows.
The bellows is disposed in the path of the air flowing
ough the unit and dimensioned to hold the deflector
k in the position shown in FIG. 7 and fully uncovering
perforations 25 when warm air such as is used for
ıting is being delivered through the outlet. The air
eam is thus discharged downwardly through all parts
the face plate (FIG. 1) as is described during the
ıting season. When cold air is supplied through the
let, the bellows 47 contracts and shifts the deflector
to fully cover the perforations 25 (FIG. 6) and thus
deflector is most effective in producing maximum out-
rd spreading of the air as it enters the room. The
forations 25 may be partially uncovered at interme-
te temperatures so as to produce, if desired, a dis-
ırge pattern which varies progressively with the changes
the temperature of the air flowing through the unit.
Sometimes it is desirable to utilize the unit above de-
ibed as a return air inlet as well as a conditioned air
ɔply outlet. This may be accomplished without de-
cting from the intended action of the deflector by an
angement such as that shown in FIG. 15 in which a
urn air duct 50 is extended downwardly through the
lar 10 with its open lower end terminating at a central
ening in the face plate 22c. In this instance, the lower
l of the duct 50 takes the form of a cylindrical collar
telescoping in and journaled on the duct proper and
ving a narrow bottom flange 52 underlying the face
te. The perforated deflector 27c is a flat ring held
ainst a washer 53 on the face plate 22c by a plurality
lugs 54 rigid with the collar 51. A lug 55 on the de-
ctor projects through an arcuate slot 56 in the face
ıte and is accessible below the latter to permit turning
the deflector to vary the uncovering of the perfora-
ns 25c in the same manner as with the slidable de-
ctor disks above described. A decorative covering of
table design may be applied to the lower end of the
urn air duct.

As before, the area of the deflector 27c is made suf-
iently smaller than the area of the ring-like inlet be-
een the collar 10 and the return duct 50 to insure that
total area of the uncovered perforations in the plate
is more than the area of the inlet. In this way, the
stream may flow directly through the unit without
ange in its direction or loss of its velocity which is
lized in the manner described above in controlling the resultant angle of discharge of the air from the face of the plate 22.

Figure 13:
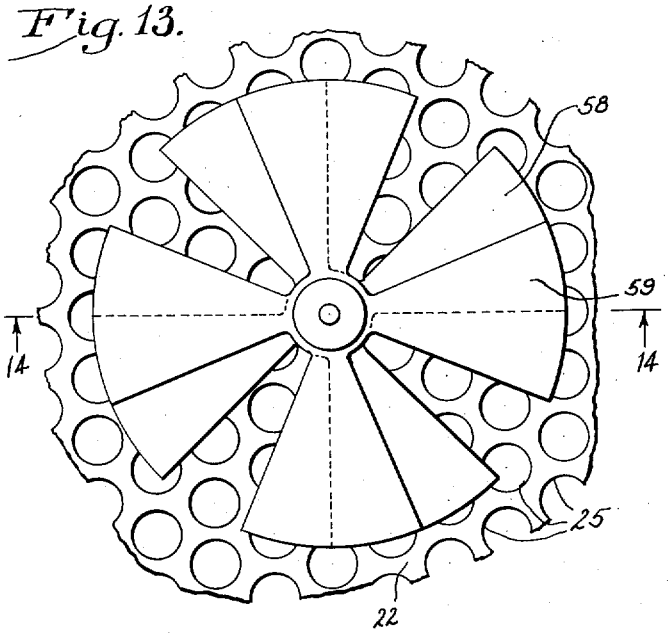
FIG. 13 is a view similar to FIG. 5 showing a modifie form of the deflector member.
Figure 14:
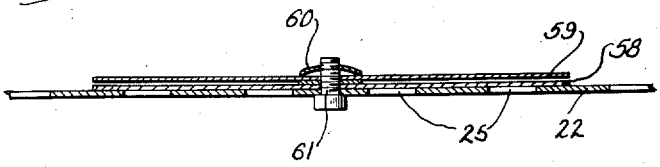
FIG. 14 is a fragmentary section taken along the li 14—14 of FIG. 13.
Figure 15:
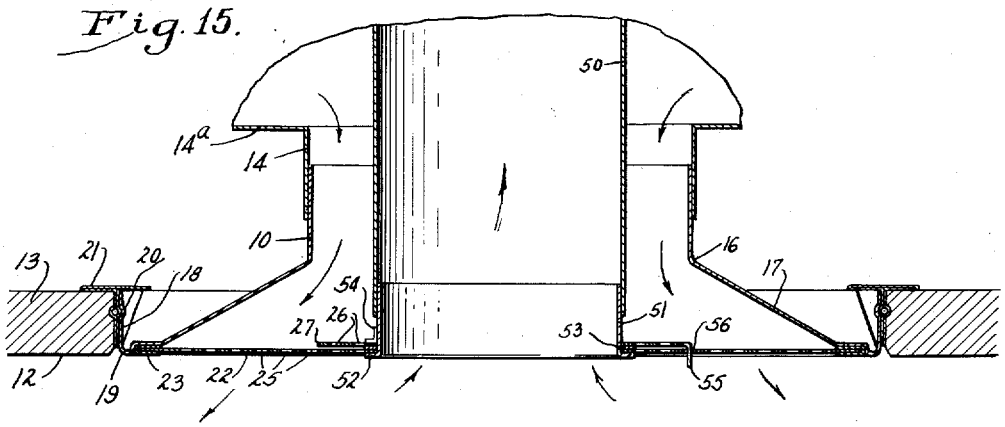
FIG. 15 is a fragmentary sectional view similar FIG. 1 showing a modification.

Instead of employing a disk perforated by relatively small holes as described above, a deflector member of the construction shown in FIGS. 13 and 14 may be used. In this case, two disks 58 and 59 of equal size and disposed one above the other are formed with imperforate segmental arms of similar width. The disk 58 is fixed to the top of the face plate 22 while the disk 59 is coupled as by a friction washer 60 to a pin 61 journaled in and projecting down through the face plate. By turning the pin, the arms 59 may be swung to positions covering the apertures between the arms 58 of the nonrotatable disk. Or, when the arms 59 overlap the arms 58, some or all of the perforations 25 intervening between the arms 58 will be uncovered, maximum opening of the perforations 25 being obtained when the arms 58 and 59 are in full register with each other. Thus, by turning the disk 59 back and forth the pattern of the discharged air may be varied the same as with the deflector construction previously described.

Figure 22:
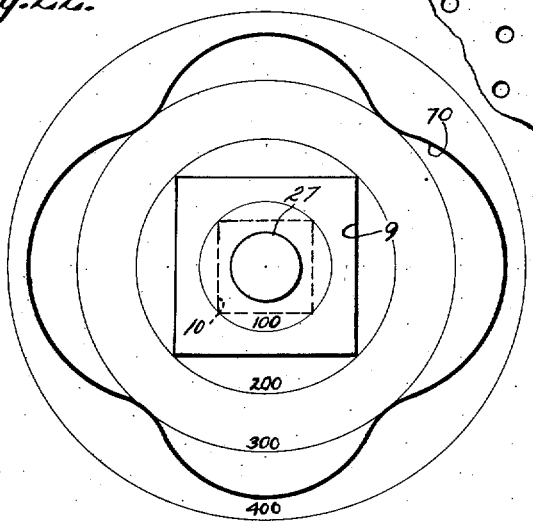
FIG. 22 is a chart showing the distribution of the velocities around the axis of the outlet when the deflec is positioned as shown in FIG. 4.

I have discovered that the velocity of the discharged air at angularly spaced points around the outlet may be varied to produce different discharge patterns by varying the shapes of the inlet 11 and the deflector 27 in relation to each other and to the outlet opening 9. For example, when the unit is constructed and adjusted as shown in FIG. 4 with the inlet neck 10 six inches square, the outlet 9 twelve inches square, and the circular deflector 27 four and one-half inches in diameter, the velocity at an eighteen inch radius and three-fourths of an inch below the ceiling will vary as shown by the curve 70 (FIG. 22). That is to say, the velocity varies from a maximum opposite the centers of the outlet edges and a minimum beyond the corners. The total variation is not substantial being only 175 feet per minute for a flow rate through the unit of 300 c.f.m. Such a unit is well suited for installations where it is desirable to throw the air outwardly approximately equal distances in all directions.

A similarly shaped velocity pattern 71 but with somewhat less variation between the maximum and minimum velocities will be achieved as shown in FIG. 25 when the inlet neck 10 is made cylindrical instead of square and six inches in diameter.

Figure 18:
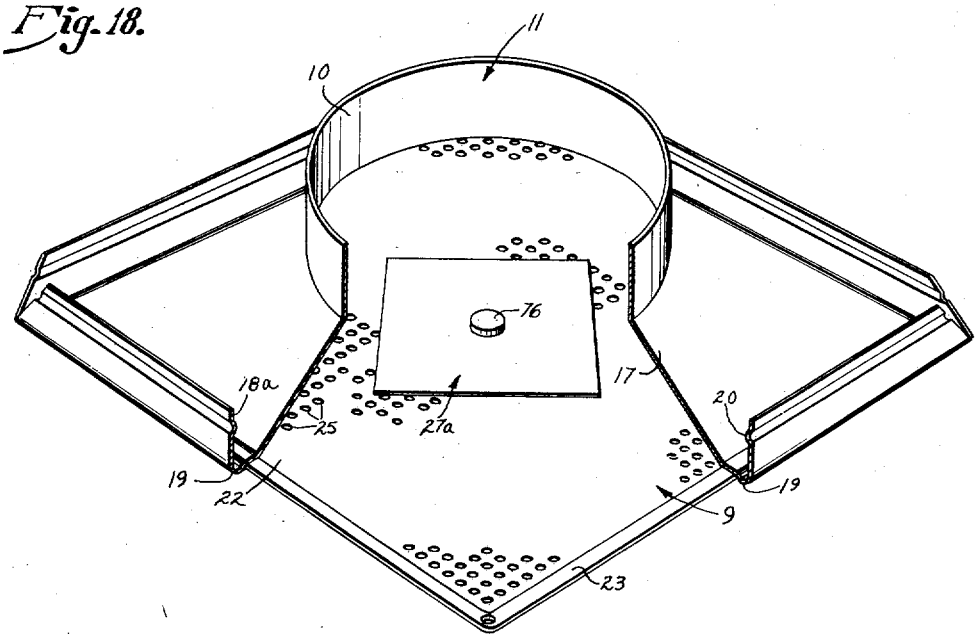
FIG. 18 is a fragmenary perspecetive view similar FIG. 10 showing a modified arrangement of the inlet a deflector plate.

A unit better suited for uniform distribution of the air to all parts including the corners of a relatively small room may be formed by employing a six inch cylindrical inlet 10 in a twelve inch square outlet 9 with the deflector 27a four and one-half inches square and centered relative to the outlet axis but turned so that the corners of the deflector bisect the side edges of the outlet 9 as shown in FIGS. 18 and 23. In this instance, a larger part of the corner area of the face plate 22 is uncovered and a correspondingly smaller part of the area at the center of the sides is left open. As a result, the air velocities outwardly from the corner of the outlet are increased substantially as compared to velocities opposite the centers of the outlet edges. Thus, by locating the outlet 9 with the edges paralleling the room walls, the peripheral discharge patterns achieved will cause a maximum throw of air toward the corners of the room. If, with the relationship shown in FIG. 23, the corners of the square deflector 27a are rounded off as indicated at 27b (FIG. 24), the minimum velocity opposite the centers of the outlet margins will be increased while retaining a generally square shape of the velocity pattern 72.

Figure 19:
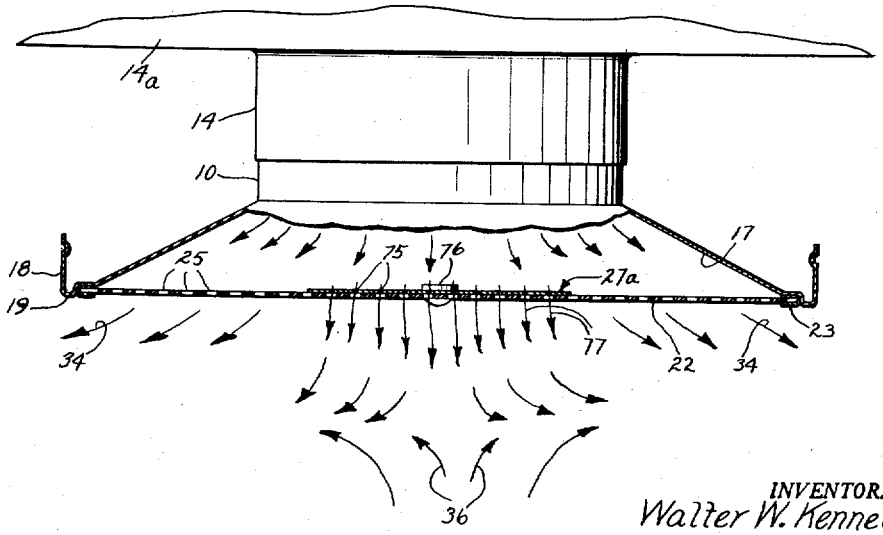
FIG. 19 is a fragmentary elevational view similar FIG. 11 showing the pattern produced by a further mo fication of the deflector.
Figure 20:
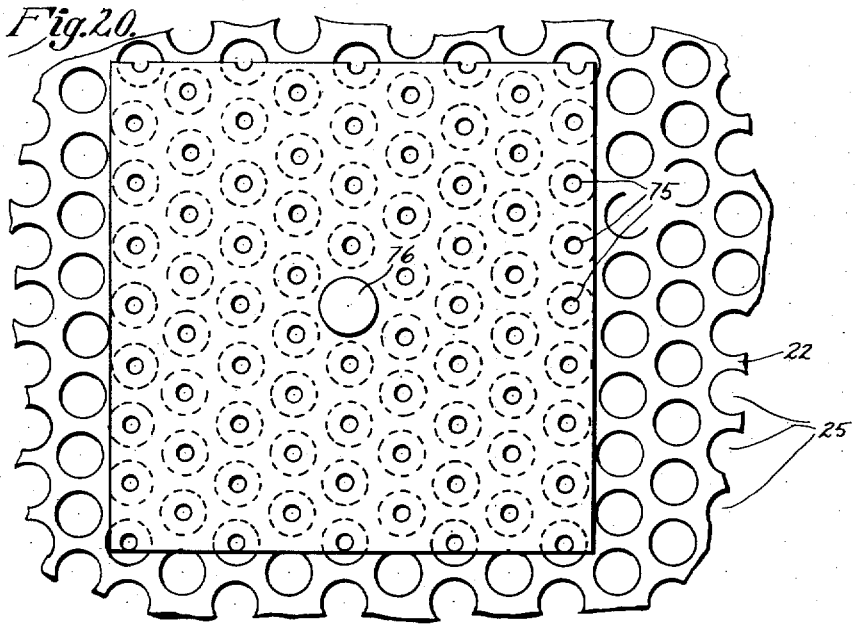
FIG. 20 is a fragmentary bottom view of FIG. 19.
Figure 21:
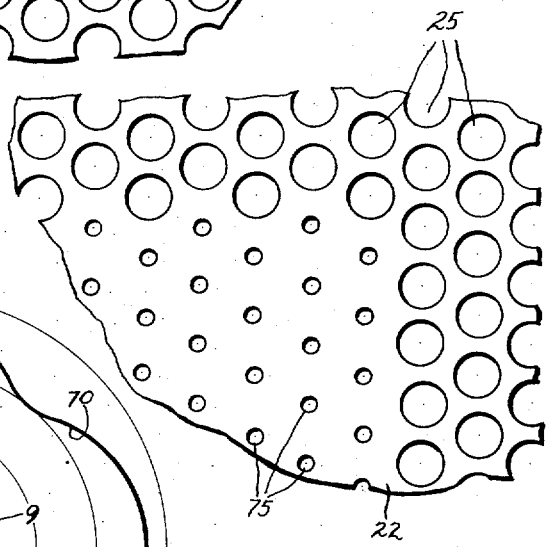
FIG. 21 is a view similar to FIG. 20 showing a mo fication thereof.

When the unit above described is conditioned for maximum outward spreading of the air delivered as is desirable in most cooling installations, warmer room air is aspirated effectually into the center of the conical air stream 34 as indicated by the arrows 36 in FIG. 4 and sweeps across the surface of the plate 22. Frequently this results in the condensation of moisture on the plate or objectionable discoloration thereof by the accumulation of the dust particles carried in the air. I have discovered that such smudging may be avoided by a simple adjustment of the deflector 27 shown in FIG. 5 or a construction of the latter to prevent the aspirated room air from coming into direct contact with the surface of the face plate. This may be accomplished by providing in the otherwise closed area of the deflector, a multiplicity of holes well distributed over the central deflecting area and correlated in size with the velocity of the air flowing through the unit so as to cause small streams or jets of the air, indicated at 77 in FIG. 19, to be discharged through the face plate and beyond the latter a short distance sufficient to block the aspirated stream and prevent it from coming into contact with the plate surface. For the flow rates commonly used in room cooling systems, the desired blocking action is achieved when the deflecting area is perforated by closely spaced holes 75 about 1/16 of an inch in diameter as compared to 3/16 of an inch for the holes 25 in the outer or uncovered portion of the face plate. Preferably, the total flow through the restricted holes is on the order of 5 to 10 percent of the total air delivered through the inlet 11.

Where the deflector 27a is formed as a separate plate lying against a face plate perforated by the holes 25 over its entire area, the restricted holes 75 are spaced to correspond to the holes 25 as shown in FIG. 20. By means of a clamping bolt or rivet 76, the deflector may be held against the face plate 22 with the holes 75 in register with the holes 25. Or, if the deflector is an integral part of the face plate 22 as shown in FIG. 21, the larger holes may be punched in the outer peripheral portion while the central or deflector area is perforated by the smaller holes. With the face plate and deflector constructed as shown in FIGS. 1 to 5 to provide for varying the air discharge pattern in service, the restricted flow through the deflector area may be achieved by a simple adjustment of the deflector to bring the desired area of the holes 25 and 26 into register. For this purpose and in order to achieve the required degree of restriction, the holes in the deflector may be shaped or spaced nonuniformly as contrasted with the equal sizing and spacing shown in FIG. 5.

It will be apparent that the air distribution unit in all of the forms above described is relatively simple and economical in construction and at the same time presents a neat and artistic appearance that blends well into various kinds of room wall or ceiling constructions. The unit is extremely versatile in its adaptability to the many different operating conditions that may be encountered in service. That is to say, it may be adjusted easily to vary the air discharge pattern, the length of its throw, the volume of air delivered, and the number of directions of discharge. Or various peripheral shapes of the discharged air stream may be achieved by correlating the size and shape of the deflector area with that of the inlet 11 and the outlet 9. The devices through which the service adjustments are made may all be mounted on and concealed within the unit itself and are conveniently accessible for adjustment either by moving a small projecting knob or by inserting a simple tool through the perforations of the face plate.

By a simple variation in construction the unit may be adapted for use in installations where objectionable discoloration or smudging of the outer surface of the face plate would occur.

This application is a continuation-in-part of my copending application Serial No. 230,038, filed June 5, 1951, now abandoned.

I claim as my invention:

[1. An air distribution unit having, in combination, a hollow casing adapted for the flow of air axially therethrough and forming an inlet at one end and an outlet at the other end, said outlet having an area at least four times the free area of said inlet, a face plate less than .035 of an inch thick covering said outlet and having closely spaced perforations therethrough distributed over substantially the full area of the outlet and having a combine free area between 35 and 55 percent of the total area c the outlet, and a deflector member, means on said casin supporting said member adjacent said face plate and op posite the inlet to intercept part of the air stream flowin through said inlet, the total area of said deflector mem ber being less than the full area of said inlet.]

[2. An air distribution unit having, in combination, hollow casing defining at one end an inlet and at the othe end an outlet, said outlet having an area substantiall greater than the free area of said inlet, a thin face plat covering said outlet and having perforations therethroug distributed over the full area of the outlet and having combined free area between 35 and 55 percent of th total area of the outlet, a deflector member, and mean supporting said deflector adjacent said face plate and op posite the inlet to intercept part of the air stream flow ing through said inlet, the total area of said deflecto member being less than the full area of said inlet.]

3. An air distribution unit having, in combination, hollow casing defining at one end an inlet and at th other end an outlet, said outlet having an area substan tially larger than the free area of said inlet, a thin fac plate covering said outlet and having perforations there through alternating with imperforate areas and having combined free area approximating half the total area o the outlet, and a deflector member of smaller area tha said inlet disposed adjacent said face plate and opposit the inlet to intercept part of the air stream flowing throug the inlet, and means supporting said member for move ment thereof relative to said plate to uncover varyin areas of the perforations in the plate.

4. An air distribution unit having, in combination, hollow casing defining at opposite ends an inlet and a outlet, a perforated face plate covering said outlet, a de flector member disposed within said casing adjacent sai face plate and opposite the inlet to intercept part of th air stream flowing through said inlet, said member havin apertures therethrough and being movable relative to sai plate to vary the air flow through the covered portion o the plate, a thermostatic actuator disposed within sai casing and expansible and contractible with changes i the temperature of the air flowing therethrough, an mechanism connecting said deflector member and sai actuator for movement of the member thereby to var the degree of uncovering of said perforations in accord ance with said temperature changes.

5. An air distribution unit having, in combination, hollow casing defining at opposite ends an inlet and a outlet, a perforated face plate covering said outlet, a de flector member disposed within said casing adjacent sai face plate and opposite the inlet to intercept part of th air stream flowing through said inlet, said member havin apertures therethrough and being movable relative to sai plate to vary the air flow through the covered portion o the plate, and means responsive to changes in the con dition of the air delivered through said casing to shif said deflector member and vary the degree of uncoverin of the perforations in the covered portion of said plate.

6. An air distribution unit having, in combination, hollow casing having an inlet at one end and a large outlet at the other end, a collar smaller than said inlet de fining an air passage extending along the axis of sai casing and mounted at the outlet end thereof to turn abou said axis, a perforated plate surrounding said collar an covering the larger end of said outlet, and a movabl deflector ring surrounding said collar adjacent said plat and overlapping the inner edge portion of the latter, sai ring having apertures therethrough adapted for differen degrees of register with the perforations of said plate.

7. An air distribution unit having, in combination, hollow casing having an inlet at one end defined by fla sides paralleling the casing axis and an outlet at the othe end with flat walls merging with said inlet sides and flar ing outwardly, a perforated face plate covering the large of said outlet, a deflector member covering the central tion of said face plate and adapted to intercept part the air stream flowing from said inlet, and a plurality baffles each hinged on said casing along the junction one of said sides and walls to swing between an outer tive position adjacent said wall and an active position rlying the edge of said deflector member whereby to uce the outward spreading of the air from the corre- nding side of said outlet.

. An air distribution unit having, in combination, a low casing having an inlet at one end defined by flat s paralleling the casing axis and an outlet at the other with flat walls merging with said inlet sides and flaring wardly, a deflector member smaller than said inlet, ns on said casing adjacent the larger end of said out- supporting said member to intercept part of the air am flowing through the casing from the inlet, and a rality of baffles hinged on said casing along the junc- s of said sides and walls and swingable into positions rlying the edge of said deflector member whereby to uce the outward spreading of the air leaving the corre- nding sides of said outlet.

. An air distribution unit having, in combination, a low casing having an inlet at one end and an outlet er than said inlet at the other end, a deflector smaller said inlet, means on said casing supporting said de- tor in said outlet in a position to intercept part of the stream flowing through the casing whereby to effect ral spreading of the tubular air stream discharged n the periphery of said outlet, and a baffle hinged at side wall of said casing to swing into positions over- g the edge of said deflector whereby to reduce the out- d spreading of the air from one side of said outlet.

0. An air distribution unit having, in combination, a ow casing having an inlet end of a rectangular cross ion and an outlet larger than said inlet at the other , vanes of trapezoidal shape hinged at their longer edges on the sides of said inlet end and adapted, when ng into a plane normal to the casing axis to form er junctions at the adjacent ends of adjacent vanes, the rter side edges of said vanes cooperating to define an t, a deflector member of smaller area than said outlet, means on said casing mounting said member opposite inlet and in the path of the air stream delivered ethrough.

1. An air distribution unit having, in combination, a ow casing adapted for the flow of air axially there- ugh and having an inlet at one end and an outlet at other end, said outlet being polygonal in shape and stantially larger in area than said inlet, a thin face e covering said outlet and having perforations there- ugh, and a deflector member smaller than said inlet cent said face plate and covering the central portion he face plate to control the flow of air through said tral portion, the periphery of said member being nded to space the corners of said outlet farther from member than the remaining portions of the outlet.

2. An air distribution outlet having, in combination, ibular casing having an inlet at one end and flaring lly toward and terminating at the other end in an et of rectangular cross section and of an area sub- tially larger than the smallest cross section of said t, a deflector of an area substantially smaller than inlet and paralleling and disposed adjacent the plane aid outlet to intercept part of the air stream flowing ugh said inlet and deflect such air laterally and out- dly, and a thin plate disposed in said plane and cover- said outlet and perforated in the area surrounding deflector by closely spaced holes permitting the air ing therethrough to be diverted by said deflected air discharged from said outlet at a small angle relative to plane, said inlet being circular in cross section and deflector having a rectangular periphery with the sides thereof inclined relative to the side edges of said outlet.

13. An air distribution outlet having, in combination, a tubular casing having an inlet at one end and flaring axially toward and terminating at the other end in an outlet of rectangular cross section and of an area substantially larger than the smallest cross section of said inlet, a deflector of an area substantially smaller than said inlet and paralleling and disposed adjacent the plane of said outlet to intercept part of the air stream flowing through said inlet and deflect such air laterally and outwardly, and a thin plate disposed in said plane and covering said outlet and perforated in the area surrounding said deflector by closely spaced holes permitting the air flowing therethrough to be diverted by said deflected air and discharged from said outlet at a small angle relative to said plane, said inlet being rectangular in cross section and said deflector comprising a substantially circular disk approximately centered in said outlet.

[14. An air distribution outlet having, in combination, a tubular casing having an inlet at one end and flaring axially toward and terminating at the other end in an alined outlet of an area substantially larger than the smallest cross section of said inlet, and a thin plate covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at a small angle relative to the plane thereof and the total area of the uncovered holes surrounding said deflector area being larger than the area of said inlet.]

[15. An air distribution outlet having, in combination, a tubular casing having an inlet at one end and flaring axially toward and terminating at the other end in an outlet of an area substantially larger than the smallest cross section of said inlet, and a thin plate covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at an angle relative to the plane thereof, said holes occupying more than 35 percent of the uncovered area of the plate around the deflector.]

[16. An air distribution outlet having, in combination, a tubular casing having an inlet at one end and flaring axially toward and terminating at the other end in an outlet of rectangular cross section and of an area substantially larger than the smallest cross section of said inlet, and a plate approximately .035 of an inch thick covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at an angle relative to the plane thereof, said holes occupying more than 35 percent of the uncovered area of the plate around the deflector.]

17. An air distribution outlet having, in combination, a tubular casing having an inlet at one end and flaring axially toward and terminating at the other end in an alined outlet of an area substantially larger than the smallest cross section of said inlet, and a thin plate covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at a small angle relative to the plane thereof and the total area of the uncovered holes surrounding said deflector area being larger than the area of said inlet, said deflecting area of said plate being perforated by closely spaced holes substantially smaller than said first mentioned holes and permitting a small fraction of the intercepted air to be discharged through the plate normal thereto and over a short range of throw whereby to oppose the flow of aspirated room air into direct contact with the ouer surface of said face plate.

18. An air distribution unit having, in combination, a hollow casing adapted for the flow of air axially therethrough and having an inlet at one end and an outlet at the other end, said outlet being substantially larger in area than said inlet, a thin face plate covering said outlet and having perforations therethrough, and an apertured deflector member smaller in area than said inlet covering the central portion of said face plate and mounted adjacent said face plate for movement relative to the plate to bring the perforations in the plate and the apertures in the member into and out of register thereby to control the flow of air through the central portion of the plate, the perforations in the remaining outer peripheral portion of the plate being uncovered.

*19. An air distribution outlet having in combination, a tubular casing having an inlet at one end and flaring axially toward and terminating at the other end in an alined outlet of an area substantially larger than the smallest cross-section of said inlet, a thin plate covering said outlet and perforated by closely spaced holes and a shallow deflector smaller in area than said inlet and having an outer peripheral edge lying substantially against the inner surface of said plate and having a top surface forming an imperforate mask which intercepts a corresponding part of the air stream flowing through said inlet and acts to deflect all of such intercepted air outwardly and laterally across the area of said plate surrounding said deflector edge and thereby cause the air discharged through the uncovered holes of said plate to be diverted outwardly in a*

*diverging pattern, the total area of said uncovered hol surrounding said deflector being larger than the area said inlet.*

*20. An air distribution outlet having, in combinatic a tubular casing having an inlet at one end for directi all of an incoming air stream along the casing axis, sa casing terminating at its other end in an outlet of substa tially larger area than said inlet and axially alined the with, a plate approximately .035 of an inch thick cov ing said outlet and perforated by a multiplicity of close and uniformly spaced holes spaced radially and circu ferentially across and around the plate and occupyi more than 35 percent of the plate area, and a deflec disposed within said casing and providing a substantia imperforate surface covering an area of said plate smal than said inlet with its outer peripheral edge substantia centered on said casing axis and disposed closely adjace and substantially in the plane of the inner face of s plate, said deflector intercepting a part of the incoming stream equal in area to said imperforate surface and a ing to deflect all of the intercepted air outwardly and l erally in all directions across said peripheral edge ana succession of the surrounding open holes in said plate a thereby force the air downwardly and diagonally throu such holes, the total free area of the open holes surrou ing said deflector being larger than the area of said in*

*21. An air distribution outlet as defined in claim 20 which the thickness of said perforated plate is less th .035 of an inch.*

*22. An air distribution outlet as defined in claim 20 which said deflector is relatively flat and is secured to a supported by said perforated plate.*

References Cited in the file of this patent
or the original patent

UNITED STATES PATENTS

| | | |
|---|---|---|
| 282,977 | Gallentine | Aug. 14, 18 |
| 791,397 | Asbury | May 30, 19 |
| 1,685,345 | Voss | Sept. 25, 19 |
| 1,997,387 | McCord | Apr. 9, 19 |
| 2,059,715 | Stacey et al. | Nov. 3, 19 |
| 2,701,998 | Wulle | Feb. 15, 19 |
| 2,775,927 | Wulle | Jan. 1, 19 |
| 2,821,898 | Kennedy | Feb. 4, 19 |
| 2,861,510 | Wulle | Nov. 25, 19 |